United States Patent [19]

Brownell

[11] Patent Number: 5,112,369
[45] Date of Patent: May 12, 1992

[54] METHOD OF APPLYING A WETTANT TO A FILTERING MEDIA

[75] Inventor: Peter Brownell, Exeter, R.I.

[73] Assignee: Allied-Signal Inc., Morristown, N.J.

[21] Appl. No.: 771,070

[22] Filed: Oct. 2, 1991

[51] Int. Cl.$^5$ .............................................. B01D 46/00
[52] U.S. Cl. ........................................ 55/97; 55/524; 55/527; 55/DIG. 24; 55/DIG. 42; 427/244
[58] Field of Search .................... 55/90, 96, 97, 233, 55/524, 527, DIG. 24, DIG. 42; 427/244

[56] References Cited

U.S. PATENT DOCUMENTS

| | | |
|---|---|---|
| 2,400,179 | 5/1946 | Venable . |
| 2,855,330 | 10/1958 | Griswold et al. . |
| 3,399,516 | 9/1968 | Haugh, Jr., et al. . |
| 3,505,794 | 4/1970 | Nutter et al. . |
| 3,675,393 | 7/1972 | Meade ..................................... 55/96 |
| 4,525,385 | 6/1985 | Pryor . |
| 4,608,173 | 8/1986 | Watanabe et al. . |
| 4,702,940 | 10/1987 | Nakayama . |
| 4,765,812 | 8/1988 | Hamonoff et al. . |

FOREIGN PATENT DOCUMENTS 1-22314  1/1989  Japan .

*Primary Examiner*—Charles Hart
*Attorney, Agent, or Firm*—Ken C. Decker; William N. Antonis

[57] ABSTRACT

A method of applying a wettant to an air laid, nonwoven, fibrous filter web or other filter media includes the steps of atomizing the wettant into relatively small particles having a diameter equal to or less than about $\frac{1}{2}$ of the diameter of the smallest fiber in the web or mat, and entraining the particles in a carrier air stream. The carrier air stream is forced through the batt at a face velocity substantially greater than the face velocity that the filter media sees when it is used to filter contaminant particles in use. Accordingly, dispersal of the wettant throughout the batt is assured, and migration of the particles into the effluent air stream when the batt is used in filtering is reduced or eliminated.

12 Claims, 1 Drawing Sheet

METHOD OF APPLYING A WETTANT TO A FILTERING MEDIA

This invention relates to a method for applying a wettant or tackifier to an air filter media to improve filtration performance.

Application of a wettant, such as an oil or oil mixture, to open cell polyurethane foam filters has been an accepted practice for several years. An application of such a wettant increases the capacity and efficiency of the foam. This practice has also been employed for some time for the same purpose on wet laid paper filter media used to filter the intake air of internal combustion engines. In either case, filter performance is enhanced. Two methods have been used to apply the wettant to foam and wet laid paper filter media. The media has been saturated with the wettant by dipping the filter media into the wettant, or the media has been subjected to a relative coarse, low pressure spray of the wettant.

More recently, air laid, non-woven filter media webs have become increasing common in filters used for filtering the intake or combustion air of an internal combustion engine. Such a web usually has a relatively high loft, and can be made from a wide variety of fiber materials of various shapes, lengths and diameters, to produce a variety of media void volumes, depending upon the size and shape of the fibers selected to manufacture the air laid filter web. These air laid materials differ from the older wet laid paper in that particulate contaminants are captured throughout the depth of the web, while wet laid filter paper captures particulates on the surface of the media. Accordingly, air laid, non-woven webs have the potential of increasing filter performance, while using materials that are less expensive than the prior art filter media. It is desirable to apply a wettant to a non-woven, air laid filter web to enhance performance for the same reason that such a wettant has been applied to the older polyurethane foam and wet laid filter media.

However, until now, attempts to efficiently apply a wettant to an air laid, non-woven filter web have failed. Direct saturation by dipping has failed because the body of a high loft, non-woven, air laid filter web softens and collapses when saturated. There is insufficient fiber stiffness to give resistance to collapse as compared to polyurethane foam and wet laid paper media. Spraying wettant with conventional nozzles has failed because the droplets tend to lodge on the surface of the air laid, non-woven filter web (or slightly below the surface). Contaminant that is removed from an air stream by the media is collected by the wettant at the surface and tends to "coat over" the surface of the air laid web, so that the contaminant cannot penetrate the web and be collected throughout its depth. Accordingly, the surface coating of the wettant results in appreciably reducing the capacity of the air laid, non-woven filter webs as compared to such air laid webs that have not been treated.

The present invention relates to a method for applying a wettant to a non-woven, air laid filter web, or an air filter cartridge made from such a web, that does not involve saturating the web or low pressure spraying of the wettant onto the web. Accordingly, the prior art difficulties of applying wettant to an air laid, non-woven filter web are eliminated.

These and other advantages of the present invention will become apparent from the following description, with reference to the accompanying drawings in which.

Figure 1:
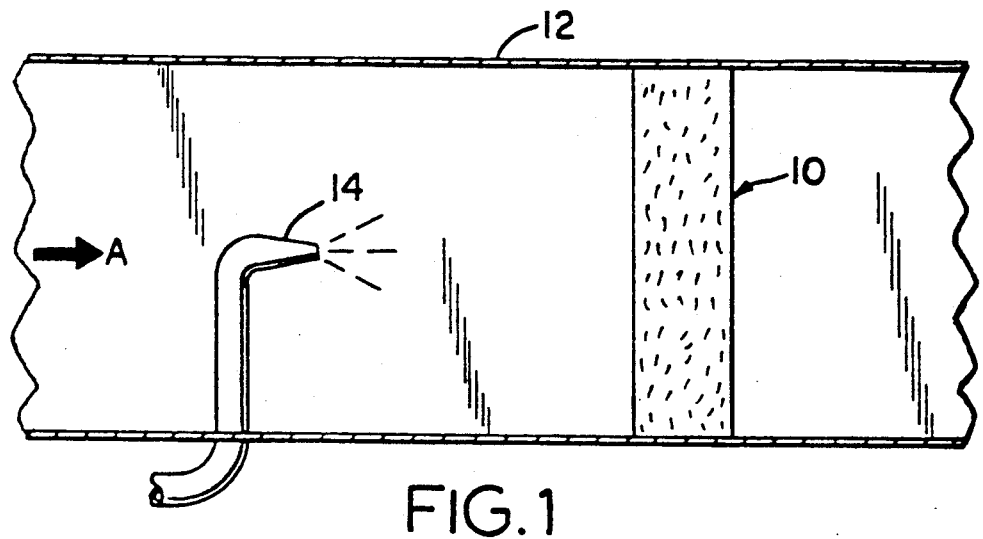
FIG. 1 is a schematic illustration of the equipment used to perform the method according to the present invention.

In the present invention, the wettant or tackifier is atomized into extremely small particles (preferably about 10 microns or less) and dispersed into a carrier air stream which carries the atomized particles through the filter web or cartridge at a relatively high velocity, which is sufficiently high to assure turbulent flow and is substantially greater than the face velocity to which the media is subjected when used to filter the combustion air of an internal combustion engine. For example, an air filter cartridge may see a face velocity of about 300 feet per minute when used to filter the combustion air of an internal combustion engine. According to the present invention, the carrier air stream into which the atomized wettant is dispersed is carried through the media in a carrier air stream at a face velocity of 1000 fpm.

It is necessary to have the droplet or particle size of the wettant as small as possible, and in any event much smaller than the naturally occurring droplets of the wettant. The small particles are readily dispersed in the air stream, easily penetrate the web, and may be readily drawn to the fibers from which the web is made by electrical charges induced in the filter web by the high velocity air flow of the carrier air stream which is forced through the web and which carries the wettant particles. Furthermore, the small particles are more readily dispersed throughout the web as they become entrained in the turbulent, high velocity air flow. Larger particles will not disperse as well and will impinge and probably coalesce at relatively few target point on the surface, or just inside the surface, of the web. Although any wettant may be used, a common wettant which has been found to acceptable consists of 10 parts isopropranol and 1 part SAE 10 heavy duty motor oil mixed together. Tests have shown that the atomized particles, for most effective penetration of the web, should have a maximum particle size equal to or less than about ½ the diameter of the smallest diameter fiber used in the web. Accordingly, since a common air laid filter batt has a minimum fiber diameter of about 20 microns, the wettant should be atomized to a 10 micron maximum size or less.

The high velocity carrier air flow that carries the wettant particles through the media serves a number of functions. As discussed above, the turbulent, high velocity flow aids in dispersing the atomized particles into the carrier air stream, and is forceful enough to carry the wettant particles throughout the depth of the web without merely coating the surface of the web. The turbulent air flow also disperses the wettant particles more readily within the web, and induces an electrical charge on the fibers, which attract the wettant particles to the fibers within the web.

The high velocity carrier air stream, which has a velocity much higher than the velocity that the media sees when it is used to filter the induction air of an internal combustion engine, eliminates or reduces wettant migration into the combustion air stream which may occur during actual filter use in prior art methods. Since the filter media in use sees a substantially lower face velocity, if the wettant particles are stable within the web when the carrier air flows through the web at 1000 fpm, the lower air flow of, for example, 300 fpm that occurs in actual filter use will not, in itself, tend to sweep the wettant off the fibers and into the effluent air stream. Furthermore, the wettant is more efficiently applied to the web by using the higher velocity stream. Tests have shown that the loading of wettant on the media increases for a time as the carrier air and wettant are forced through the web, but after a period of time the loading stabilizes. Accordingly, the maximum loading can be determined by weighing the batt or by monitoring the droplets entrained in the carrier air stream downstream of the batt when the batt or web is treated. It has been found that the quantity of wettant necessary for good filter performance is less than that previously thought to be necessary on the prior art foam and wet laid paper filter media. Accordingly, the increase in weight of the untreated web as compared to the web treated by the wettant by using the process of the present invention is very low for the gains in filtration performance attained, as compared to the wettant commonly applied to the prior art foam and wet laid paper media.

Accordingly, the present invention enables wettants to be efficiently applied to air laid, non-woven filter webs or batts. Accordingly, the effectiveness of non-woven, air laid media for heavy duty filter applications is increased, and the treated batt is particularly effective for removing soot and other fine particles from the combustion air stream of a motor vehicle. Since air laid media normally cost substantially less than the polyurethane foam now used to remove soot, substantial cost reductions are also possible. Air laid, non-woven batts are more effective in removing contaminants on a volume basis than other filter media, so it is possible that heavy duty air filters may be made smaller than existing filters using conventional media, while retaining or even increasing capacity. Migration of the wettant or tackifier is substantially reduced or eliminated as discussed above. The method can be performed on media in flat sheet form, and is equally applicable to media that is already been pleated and formed into a filter cartridge.

Referring now to FIG. 1, a flat sheet of a non-woven, air laid, fibrous filter media generally indicated by the numeral 10 is mounted transversely across an air duct 12. Air flow, indicated by the arrow A, is forced through the duct 12 in a conventional manner. A conventional atomizer, generally indicated schematically by the numeral 14, is mounted in the duct approximately five feet upstream from the media 10. The wettant mixture, of the type discussed above, is fed to the atomizer 14 by a conventional plunger feeder, and is then atomized into the air stream. Air at 1000 fpm face velocity is forced through the media 10 carrying the particles produced by the atomizer 14 until the weight of the media 10 stabilizes. At this point, the process is discontinued, and the media 10 has been fully treated.

Figure 2:
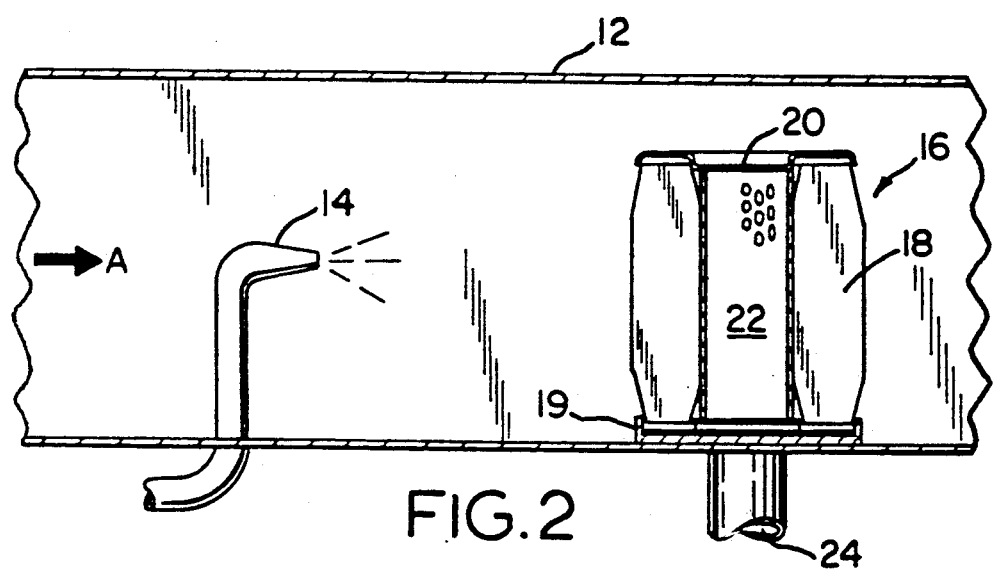
FIG. 2 is a view similar to FIG. 1, but illustrates the method of applying the wettant to a finished filter cartridge comprised of a pleated, non-woven web.

Referring to FIG. 2, a filter cartridge generally indicated by the numeral 16 is mounted on a fixture 19 which is rotatably mounted within the duct 12. The media of the cartridge 16 consists of an annular array of radially tapered pleats generally indicated by the numeral 18. The pleats 18 are formed from a sheet of air laid, non-woven, fibrous filter material produced in the conventional manner. The top of the cartridge 16, viewing FIG. 2, is closed with a closed end cap 20, and the inner tips of the pleats 18 are supported by conventional metallic centertube 22. When in use, the cartridge 16 is placed in a conventional air cleaner housing (not shown), and combustion air is communicated through an inlet of the housing into the outer circumferential surface defined by the tips of the pleat 18, and is drawn through the pleats by engine vacuum into the centertube 22 and is then communicated to the engine through the open bottom end of the filter (viewing FIG. 2). The atomizer 14 is used to atomize the particles of wettant as discussed above into an air stream A, which would typically be forced through the duct 12 at a velocity relative to the filter cartridge 16 of about 1000 fpm. In order to assist penetration of the wettant throughout the depth of the batt, air is removed from the downstream side of the pleats 18 through an opening 24.

Figure 3:
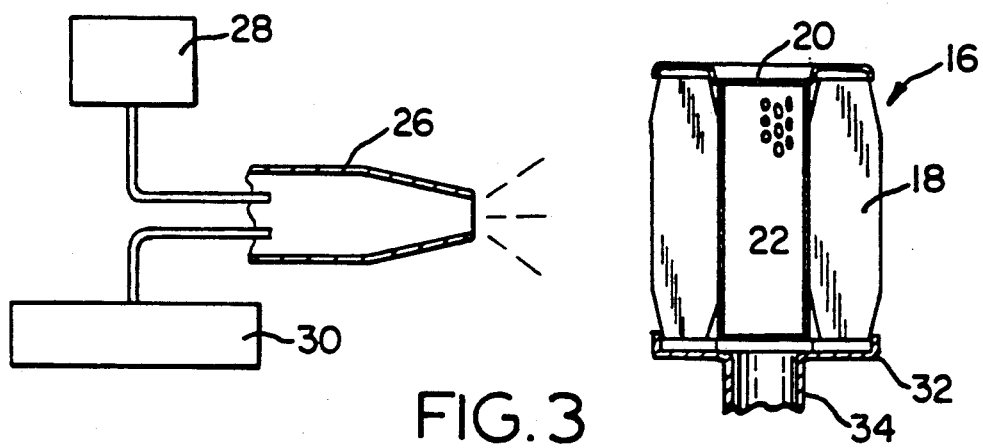
FIG. 3 is a schematic illustration of another embodiment of the invention.

Referring to FIG. 3, a high velocity nozzle is indicated schematically at 26. High pressure air from a compressed air source generally indicated by the numeral 28 is fed through the nozzle 26, and a wettant 30 is fed to an atomizer (not shown) within the nozzle 26 for dispersal into the air stream. The nozzle 26 is designed to achieve a velocity of the carrier air flowing through the nozzle sufficiently high that when the carrier air strikes the cartridge 16 being treated that the carrier has a face velocity relative to the cartridge of at least 1000 fpm. The cartridge 16 is mounted in a fixture 28 which can rotate the cartridge 16 relative to the nozzle, or the fixture 28 can be fixed and the operator may move the nozzle 26 around the cartridge 18 to assure even application of the carrier air to the outer surface of the cartridge 16. To aid in dispersal of the wettant throughout the depth of the pleats, air is removed from the downstream side of the cartridge 18 through opening 30 in the fixture 28.

I claim:

1. Method for applying a wettant to a filtering media for filtering particulate contaminants from an air to be passed through the media with a maximum expected face velocity when the media is used to filter the contaminants from the air, comprising the steps of dispersing the wettant in a carrier air stream before the carrier air stream is passed through the media, and then passing the carrier air stream through the media at a face velocity substantially greater than the face velocity to which the media is subjected when used in filtering.

2. Method for applying a wettant to a filtering media as claimed in claim 1, wherein said method includes the step of atomizing the wettant as it is dispersed in the carrier air stream to a particle size substantially less than the size of naturally occurring droplets of the wettant.

3. Method for applying a wettant to a filtering media as claimed in claim 2, wherein said particles have a particle size of less than about ten microns.

4. Method for applying a wettant to a filtering media as claimed in claim 2, wherein said media is a nonwoven batt of fibers, and said droplets are atomized to a size of less than about one half of the smallest fiber contained in the batt.

5. Method for applying a wettant to a filtering media as claimed in claim 1, wherein the face velocity at which the carrier air stream applying the wettant to the media contacts the latter is greater than about 900 feet per minute.

6. Method for applying a wettant to a filtering media as claimed in claim 1, wherein the carrier air stream carrying said wettant is passed through the media as long as the wettant captured by the media increases and is discontinued when the quantity of wettant captured by the media stabilizes.

7. Method for applying a wettant to a filtering media as claimed in claim 1, wherein said method includes the steps of placing the media to be treated in a duct, communicating the carrier air stream through the duct, the dispensing the wettant into the carrier air stream upstream of said media.

8. Method for applying a wettant to a filtering media as claimed in claim 7, wherein said media is in the form of a panel placed transversely with respect to said duct.

9. Method for applying a wettant to a filtering media as claimed in claim 7, wherein said media is in the form of an annular cartridge placed in said duct and said method includes the step of drawing air from the downstream side of said cartridge to aid in distributing wettant through the media.

10. Method for applying a wettant to a filtering media as claimed in claim 1, wherein said method includes the steps of forcing said carrier air stream applying said wettant to the media through a nozzle, dispensing said wettant into the carrier air stream as it is forced through the nozzle, and using said nozzle to direct a jet of carrier air with the wettant dispersed therein against the media, and moving the nozzle and/or the media relative to one another to dispense the carrier air and wettant around the surface of the media.

11. Method for applying a wettant to a filtering media as claimed in claim 10, wherein said method includes the step of drawing air from the downstream side of said cartridge to aid in distributing wettant through the media.

12. Method for applying a wettant to a filtering media as claimed in claim 10, wherein said media is in the form of an annular cartridge and said method includes the step of drawing air from the downstream side of said cartridge to aid in distributing wettant through the media.

* * * * *